(12) United States Patent
Beck

(10) Patent No.: US 7,481,755 B2
(45) Date of Patent: Jan. 27, 2009

(54) TRANSPORT SHAFT FOR A FOLDING MACHINE

(75) Inventor: Christoph Beck, Spiegelberg (DE)

(73) Assignee: Maschinenbau Oppenweiler Binder GmbH & Co. KG, Oppenweiler (DE)

( * ) Notice: Subject to any disclaimer, the term of this patent is extended or adjusted under 35 U.S.C. 154(b) by 764 days.

(21) Appl. No.: 11/011,779

(22) Filed: Dec. 15, 2004

(65) Prior Publication Data

US 2005/0159288 A1    Jul. 21, 2005

(30) Foreign Application Priority Data

Dec. 16, 2003   (DE) .............................. 203 19 527 U

(51) Int. Cl.
*F16C 13/00* (2006.01)
(52) U.S. Cl. .......................................... 492/47; 492/28
(58) Field of Classification Search .................. 492/50, 492/53, 59, 28, 47; 493/439, 442
See application file for complete search history.

(56) References Cited

U.S. PATENT DOCUMENTS

| | | | | |
|---|---|---|---|---|
| 4,211,589 A | * | 7/1980 | Fisher et al. ................ | 156/73.5 |
| 4,451,245 A | * | 5/1984 | Hornig et al. ................ | 464/181 |
| 4,495,683 A | * | 1/1985 | Delhaes ........................ | 193/37 |
| 5,417,500 A | * | 5/1995 | Martinie ...................... | 384/513 |
| 5,421,259 A | | 6/1995 | Shiba et al. | |
| 5,474,630 A | * | 12/1995 | Rouillot ....................... | 156/149 |
| 5,601,494 A | * | 2/1997 | Duggan ....................... | 464/182 |
| 5,632,685 A | * | 5/1997 | Myers ......................... | 464/183 |
| 6,077,207 A | | 6/2000 | Yokoyama et al. | |
| 6,709,372 B2 | * | 3/2004 | Dietsch ....................... | 492/53 |
| 6,716,148 B1 | * | 4/2004 | Fortin et al. ................... | 492/47 |
| 2004/0033083 A1 | * | 2/2004 | Fukuyama et al. ............ | 399/53 |
| 2006/0249218 A1 | * | 11/2006 | Mettler ........................ | 139/79 |

FOREIGN PATENT DOCUMENTS

| | | |
|---|---|---|
| DE | 1 907 572 | 8/1969 |
| DE | 35 45 304 A1 | 7/1987 |
| DE | 42 24 235 A1 | 7/1993 |
| DE | 691 10 274 T2 | 10/1995 |
| DE | 203 07 169 U1 | 7/2003 |
| EP | 363887 A2 * | 4/1990 |
| EP | 1 264 793 A2 | 12/2002 |
| EP | 1 344 622 A1 | 9/2003 |
| GB | 2 059 013 A | 4/1981 |
| JP | 63 098463 | 4/1988 |
| JP | 09 249352 | 9/1997 |
| JP | 2005176653 A * | 7/2005 |
| JP | 2006203177 A * | 8/2006 |

* cited by examiner

*Primary Examiner*—Essama Omgba
(74) *Attorney, Agent, or Firm*—Rothwell, Figg, Ernst & Manbeck P.C.

(57) ABSTRACT

A transport shaft for a folding machine includes a shaft body (12), which has an annular cross section, and at least one transport element (14, 16) of annular cross section mounted in a rotationally fixed manner on the shaft body (12). The shaft body (12) is made from carbon-fiber synthetic material.

2 Claims, 2 Drawing Sheets

TRANSPORT SHAFT FOR A FOLDING MACHINE

FIELD OF THE INVENTION

The invention relates to a transport shaft for a folding machine, which is formed in particular as a folding roller or cutter shaft.

DESCRIPTION OF THE BACKGROUND ART

Folding rollers and cutter shafts currently in use have shaft bodies which are made from steel and therefore have a relatively great weight. This makes handling more difficult when the transport shafts are installed in and removed from the folding machine. In addition, the overall weight of the folding machine is increased. Furthermore, the deflection of the known transport shafts is relatively great at large operating widths, as a result of which, along the length of the transport shafts, different forces act on a sheet to be transported.

SUMMARY OF THE INVENTION

The object of the invention is, with constructionally simple means, to produce a transport shaft for a folding machine with low weight and small deflection.

According to the invention, this object is achieved by a transport shaft comprising a shaft body having an annular cross section, and at least one transport element of annular cross section mounted in a rotationally fixed manner on said shaft body, wherein said shaft body is made from carbon-fiber synthetic material.

If the transport element mounted on the shaft body is a folding roller body, the transport shaft can be used as a folding roller.

A number of transport rollers can also be mounted in a rotationally fixed manner on the shaft body at a distance from one another.

The transport shaft can be used as a cutter shaft if cutter seats of annular cross section are mounted in a rotationally fixed manner on the shaft body between adjacent transport rollers.

In order to avoid damage to the shaft body made of carbon-fiber synthetic material during fastening of the transport roller or of the cutter seat, the transport roller or the cutter seat can have an annular roller body, in one end side of which a cylindrical internal recess is formed. A clamping ring interrupted by a clamping gap, which ring is connected axially to the roller body, is inserted into the cylindrical recess. The clamping ring is fastened on the shaft body with a press fit.

By virtue of the fact that the shaft body is made from carbon-fiber synthetic material, the weight of the transport shaft can be reduced by more than 80%, the deflection of the transport shaft according to the invention being smaller than in the case of a transport shaft made of steel. In order to achieve additional weight-saving, it is preferable to make the transport rollers and the cutter seats from aluminum.

BRIEF DESCRIPTION OF THE DRAWINGS

An illustrative embodiment of the invention is explained in greater detail with reference to the drawings, in which.

DETAILED DESCRIPTION OF THE INVENTION

Figure 1:
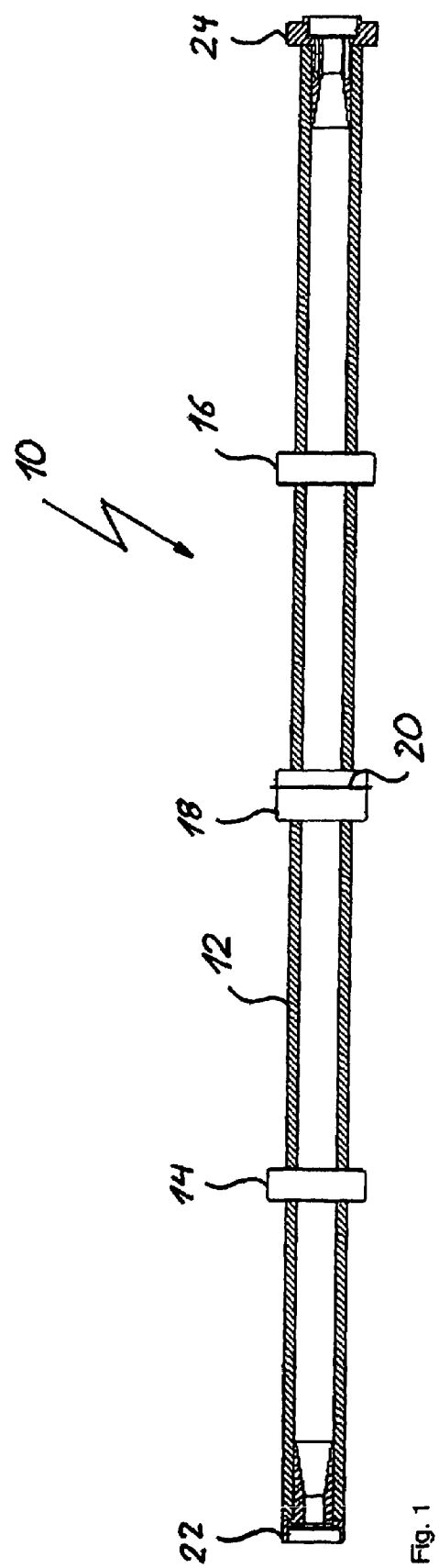
FIG. 1 shows a longitudinal section through a transport shaft.

The transport shaft 10 has an elongate shaft body 12 of annular cross section, which is made from carbon-fiber synthetic material. At the two end sides of the shaft body 12, rotation seats 22, 24 for rotatable mounting and drive of the shaft body 12 are mounted in a manner known per se.

Two transport rollers 14, 16 are mounted in a rotationally fixed manner on the shaft body 12 at a distance from one another. In the center, between the transport rollers 14, 16, an annular cutter seat 18 is furthermore mounted in a rotationally fixed manner on the shaft body 12, on which seat a cutter 20, for example for perforating sheets, is received.

Figure 3:
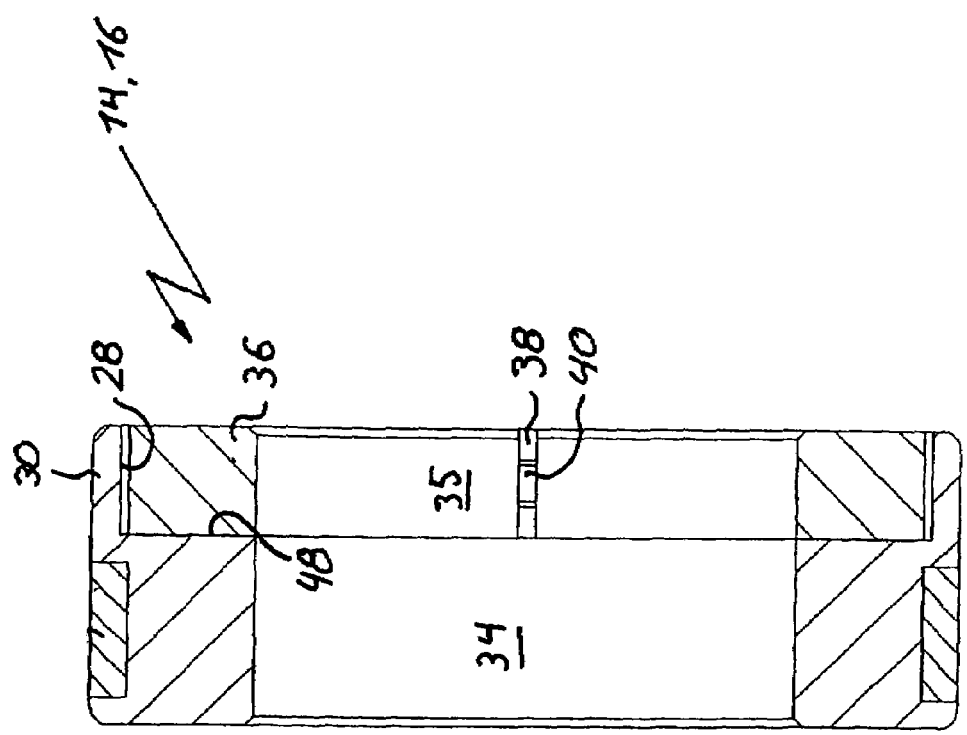
FIG. 3 shows the section III-III from FIG. 2.
Figure 2:
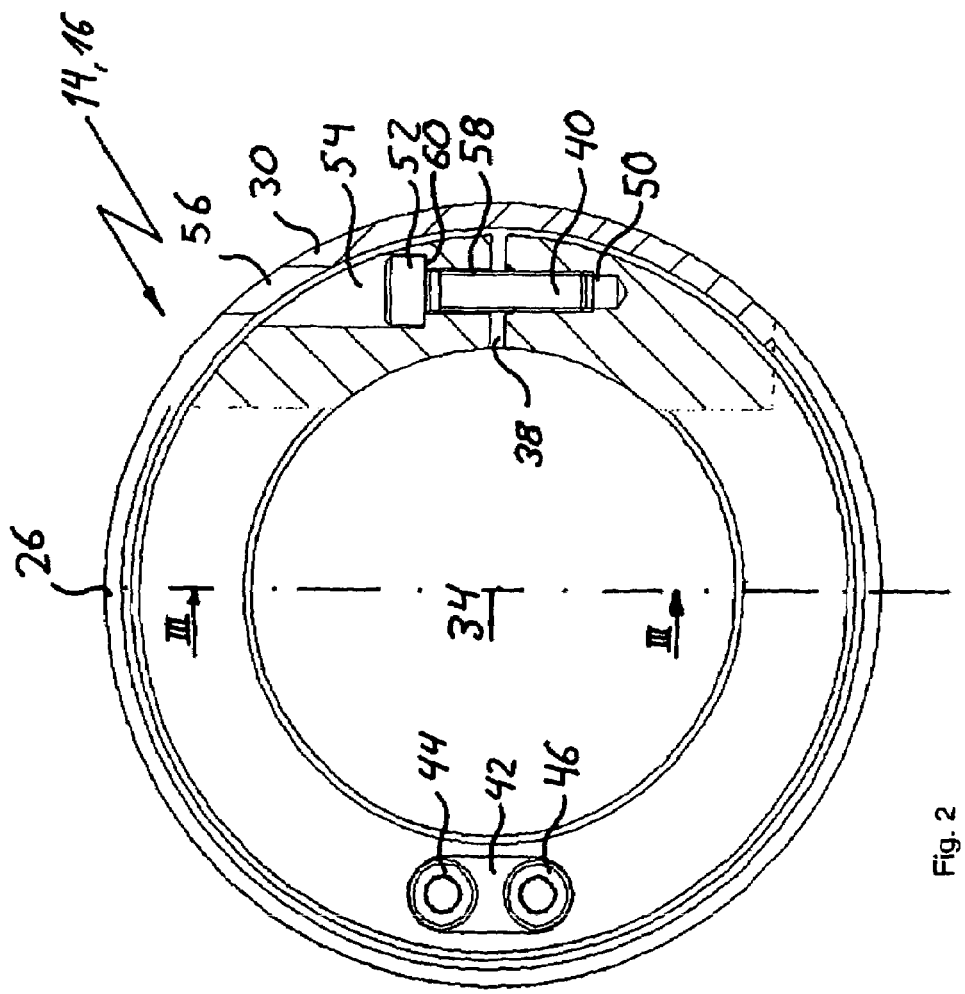
FIG. 2 shows a side view of a transport shaft.

As can be seen in FIGS. 2 and 3, the transport rollers 14, 16 each have a cylindrical annular roller body 26, in which a cylindrical internal recess 34 is formed coaxially, the inside diameter of which corresponds essentially to the outside diameter of the shaft body 12.

In the right end side in FIG. 3, a cylindrical internal recess 28 merging with the internal recess 34 is formed coaxially in the roller body 26, the diameter of the recess 28 being greater than the diameter of the internal recess 34. The internal recess 28 is delimited radially by an annular shoulder 30 and axially by a bottom surface 48.

A cylindrical annular clamping ring 36 is inserted into the internal recess 28 in such a way that it rests on the bottom surface 48 and its end side facing away from the bottom surface 48 lies flush with the end side of the roller body 26. The outside diameter of the clamping ring 36 is slightly smaller than the inside diameter of the internal recess 28, whereas its inside diameter corresponds essentially to the inside diameter of the internal recess 34. The clamping ring 36 is in one place interrupted by a clamping gap 38, which extends horizontally in FIGS. 2 and 3. On that side of the clamping ring 36 lying diametrally opposite the clamping gap 38, a recess 42 is formed in the end side of the clamping ring 36, in which recess two screws 44, 46 are arranged, which pass axially through the clamping ring 36 and in each case engage in a threaded bore (not shown) in the bottom surface 48, by virtue of which the clamping ring 36 is fastened axially to the roller body 26. Above the clamping gap 38, a vertical bore 54 ending in the outer side of the clamping ring 36 is formed in the clamping ring 36, which bore is followed, in the direction of the clamping gap 38, by a bore 58, the inside diameter of which is smaller than the inside diameter of the bore 54, by virtue of which a shoulder 60 is formed. Opposite the bore 58, a threaded bore 50 is formed in the clamping ring 36. A clamping screw 40 passes through the bore 58 and is in thread engagement with the threaded bore 50, the head 52 of the clamping screw 40 bearing against the shoulder 60. By turning the threaded screw 40, the width of the clamping gap 38 can be adjusted, and the clamping ring 36 can consequently be fastened on the shaft body 12 by a press fit. The head 56 provided in the annular shoulder 30, which opening is aligned with the bore 54.

To fasten the transport roller 14 or 16, the roller body 26 is pushed onto the shaft body 12. Then, at a desired position, the clamping screw 40 is tightened, which causes the clamping ring 36 to exert a clamping force on the shaft body 12, by virtue of which the transport roller 14 or 16 is fastened in a rotationally fixed manner on the shaft body 12.

The cutter seat 18 can likewise have a roller body 26 as shown in FIGS. 2 and 3; means for receiving cutters are then to be provided on the outer side of the roller body 26.

In order to achieve additional weight-saving, it is preferable to make the transport rollers 14, 16 and the cutter seats 18 from aluminum.

The invention claimed is:

1. A transport shaft for a folding machine, comprising a shaft body made from carbon-fiber synthetic material and having an annular cross section, and a plurality of transport rollers of annular cross section mounted in a rotationally fixed manner on said shaft body, said plurality of transport rollers being mounted on said shaft body at a distance from one another, wherein
   each of said transport rollers has an annular roller body, in one end side of which a cylindrical internal recess is formed, and
   each of said transport rollers includes a clamping ring interrupted by a clamping gap disposed in said cylindrical internal recess, the clamping ring being connected axially to said roller body and fastened on said shaft body with a press fit.

2. The transport shaft as claimed in claim 1, further comprising a plurality of cutter seats of annular cross section mounted in a rotationally fixed manner on said shaft body between adjacent ones of said transport rollers, wherein
   each of said cutter seats has an annular roller body, in one end side of which a cylindrical internal recess is formed,
   each of said cutter seats includes a clamping ring interrupted by a clamping gap disposed in said cylindrical internal recess, the clamping ring being connected axially to said roller body and fastened on said shaft body with a press fit.

* * * * *